(12) United States Patent
Birdseye

(10) Patent No.: US 9,662,934 B2
(45) Date of Patent: May 30, 2017

(54) WHEEL RIM

(71) Applicant: Nicholas Birdseye, North Adelaide (AU)

(72) Inventor: Nicholas Birdseye, North Adelaide (AU)

(*) Notice: Subject to any disclaimer, the term of this patent is extended or adjusted under 35 U.S.C. 154(b) by 395 days.

(21) Appl. No.: 14/352,267

(22) PCT Filed: Oct. 16, 2012

(86) PCT No.: PCT/AU2012/001251
§ 371 (c)(1),
(2) Date: Apr. 16, 2014

(87) PCT Pub. No.: WO2013/056297
PCT Pub. Date: Apr. 25, 2013

(65) Prior Publication Data
US 2014/0339886 A1    Nov. 20, 2014

(30) Foreign Application Priority Data

Oct. 17, 2011 (AU) .................. 2011904273

(51) Int. Cl.
| | | |
|---|---|---|
| B60B 21/08 | (2006.01) | |
| B60B 21/02 | (2006.01) | |
| B60B 21/04 | (2006.01) | |
| B60B 21/06 | (2006.01) | |
| B60B 21/10 | (2006.01) | |
| B60B 1/04 | (2006.01) | |

(52) U.S. Cl.
CPC ............. *B60B 21/02* (2013.01); *B60B 21/04* (2013.01); *B60B 21/062* (2013.01); *B60B 21/066* (2013.01); *B60B 21/08* (2013.01); *B60B 21/104* (2013.01); *B60B 1/043* (2013.01); *B60B 2200/47* (2013.01); *B60B 2360/104* (2013.01); *B60B 2360/3416* (2013.01); *B60B 2900/1216* (2013.01); *B60B 2900/325* (2013.01)

(58) Field of Classification Search
CPC ..... B60B 21/062; B60B 21/066; B60B 21/08; B60B 21/00; B60B 21/02
USPC ........................................ 301/55, 58, 95.101
See application file for complete search history.

(56) References Cited

U.S. PATENT DOCUMENTS

| | | | | |
|---|---|---|---|---|
| 365,091 | A * | 6/1887 | Owen ................. | A61H 3/04 301/58 |
| 759,124 | A * | 5/1904 | Oswald ............... | B60B 21/062 301/110 |
| 2,034,360 | A * | 3/1936 | Sill .................... | B21D 53/30 29/894.353 |
| 3,732,951 | A * | 5/1973 | Hata ................... | B62L 1/10 301/95.101 |
| 4,266,417 | A | 5/1981 | Imamura | |
| 4,483,729 | A * | 11/1984 | Fujisaki ............. | B29C 70/202 152/411 |
| 6,070,948 | A * | 6/2000 | Chen .................. | B60B 1/041 301/58 |
| 6,425,641 | B1 * | 7/2002 | Herting ............... | B60B 1/003 301/58 |

(Continued)

*Primary Examiner* — Jason Bellinger
(74) *Attorney, Agent, or Firm* — Renner Kenner Greive Bobak Taylor & Weber

(57) ABSTRACT

A bicycle wheel rim including an outer annular portion adapted to receive a tire and an inner peripheral radial portion that has both a plurality of circumferentially arranged spoke openings and a braking surface on this portion.

8 Claims, 2 Drawing Sheets

(56) References Cited

U.S. PATENT DOCUMENTS 7,114,785 B2 10/2006 Ording
2011/0248552 A1 10/2011 Koshiyama

* cited by examiner

WHEEL RIM

CROSS REFERENCE TO RELATED APPLICATIONS

This application is the National Stage of International Application No. PCT/AU2012/001251, filed on Oct. 16, 2012, which claims the benefit of Australian Application No. 2011904273 filed on Oct. 17, 2011. The contents of both applications are hereby incorporated by reference in their entirety.

FIELD OF THE INVENTION

The field of the present invention relates to bicycle wheels having an annular rim to receive a tyre thereon. More specifically, the present invention relates to an improved aerodynamic rim, where the spokes are mounted to a central raised ridge or extension.

DESCRIPTION OF THE PRIOR ART

Aerodynamics plays an important part in cycling activities with every cyclist having to overcome wind resistance in order to increase speed, which takes energy. Wind resistance is a result of aerodynamic drag, which consists of two forces; air drag and direct air friction. A cyclist has to push their way through the mass of air that is in front of them with every pedal stroke and is most pronounced on flat terrain where the air drag can account for between 70-90% of the overall resistance. At approximately 37 kmh, 80% of a riders energy is used just to overcome wind resistance.

In order to reduce the aerodynamic drag, many cycling products are shaped to reduce form drag, being the drag that results from the shape of the object, as such many cycling products such as frames and wheels are shaped with a taper. Many wheels are classified as deep section, >50 mm rim depth, in an effort to be more aerodynamic and reduce form drag over the more traditional box section bicycle rims.

The main issue is that deep section rims made from aluminium come with a significant weight penalty. As such it was not until the advent of modern carbon fibre technology in wheel manufacturing that such aerodynamic deep section rims began to appear with a dramatic reduction in weight over the shallower heavier aluminium rims.

However, deep section carbon fibre rims can be time consuming to produce, and by virtue of the relative cost of the raw material, moulding machines and layup process, makes the finished item an expensive article. Also, carbon fibre wheels have vastly different strength characteristics compared to alloy wheel, often failing in more dramatic circumstances due to their propensity to catastrophically fail. Aluminium rims have the ability to deform rather than collapse under similar, impact loads that would otherwise shatter a carbon fibre rim.

Additionally, aluminium has greater heat dissipation characteristics over carbon fibre allowing the heat build up from excessive braking to be transferred out from the rim into the atmosphere. Carbon fibre rims are known to fail under high breaking loads, the build up in heat in the rim leading to warping of the rim due to the outward pressure of the clincher tyre exerted onto the sidewalls of the rim.

While there are many carbon fibre deep dish wheels, there is still a market and need for more affordable deep dish wheels that address the problems of the prior art wheel rims.

OBJECT OF THE INVENTION

It is an object of the present invention to provide a deep dish aerodynamic wheel.

Other objects and advantages of the present invention will become apparent from the following description, taking in connection with the accompanying drawings, wherein, by way of illustration and example, an embodiment of the present invention is disclosed.

SUMMARY OF THE INVENTION

According to the present invention, although this should not be seen as limiting the invention in any way, there is provided a rim for a bicycle wheel, the rim including an outer annular portion adapted to receive a tyre, an inner peripheral radial portion having a plurality of circumferentially arranged spoke openings wherein the inner peripheral radial portion is characterised in that it has a braking surface thereon.

In preference, the outer annular portion and the inner peripheral radial portion form a "Y" shape.

In preference, the inner peripheral radial portion projects towards a hub portion of the bicycle wheel.

In preference, the inner peripheral radial portion further includes a cut out section to receive a valve of a tube for inflation of the tyre.

In preference, an outer surface of the outer annular portion being an air engaging surface includes a plurality of surface features designed to create a turbulent boundary layer when the wheel travels through air to reduce aerodynamic drag.

In preference, an outer surface of the inner peripheral radial portion being an air engaging surface includes a plurality of surface features designed to create a turbulent boundary layer when the wheel travels through air to reduce aerodynamic drag.

BRIEF DESCRIPTION OF THE DRAWINGS

By way of example, an embodiment of the invention is described more fully herein with reference to the accompanying drawings, in which.

DETAILED DESCRIPTION OF THE INVENTION

Figure 1:
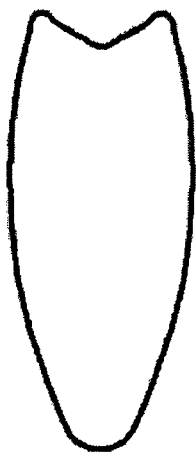
FIG. 1 shows a cross section of a bicycle rim of the prior art.
Figure 2:
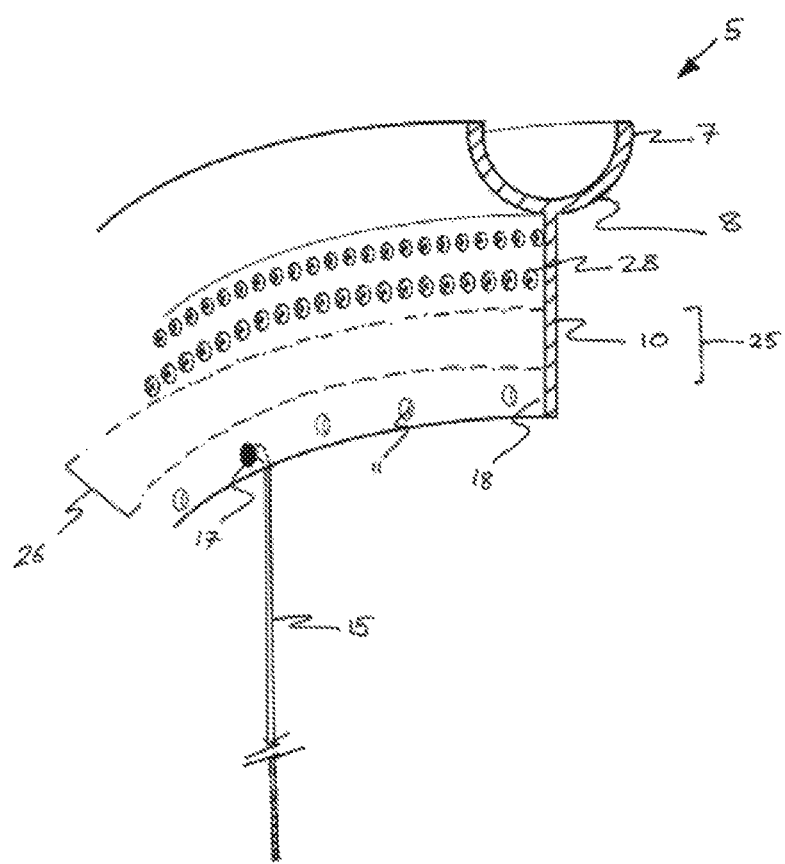
FIG. 2 shows a cross section of a bicycle rim of the present invention.

Aerodynamic bicycle wheels known in the prior art are made from materials such as carbon fibre to create bulbous cross sectional shapes as shown in FIG. 1. To a lesser extent such bicycle rim shapes have also been made previously from aluminium however such rims are generally heavy in comparison to their carbon fibre embodiments.

The bicycle wheel rim 5 of the present invention has outer annular portion 7 adapted to receive a tyre. The tyre can be of clincher type or a tubular type. In the event of a clincher type tyre being used the outer annular portion 7 would include a pair of opposing flanges or beads shaped to engage with a bead of the clincher tyre (not shown). Such arrangements are well known by those skilled in the art.

The bicycle wheel rim 5 further includes an inner peripheral radial portion 10, projecting from the outer surface 8 of the outer annular portion 7 towards a hub section (not shown) of the bicycle wheel. Arranged circumferentially about the inner peripheral radial portion 10 is a plurality of spoke openings 11 adapted to receive an end of a spoke 15.

The spoke 15 engages with the peripheral radial portion 10 by insertion of the spoke 15 though the opening 11 so that the spoke head 17 abuts the portion 18 of the peripheral radial portion 10. As such, the spoke 15 has at its opposite end a threaded section for insertion and attachment to a suitably configured hub flange (not shown).

Alternatively, the threaded section of the spoke 15 may be attached to an adaptor spoke section, so that traditional hub flange fittings may be used. Alternatively, other methods of spoke attachment known to those skilled in the art of wheel building can be utilized without departing from the scope of the invention.

The peripheral radial portion 10 is the braking section of the wheel rim 5, with both sides (25 and 26) of the peripheral radial portion 10 machined or constructed to act as a braking surface. The brakes of a bicycle fitted with the wheel rims 5 have the braking shoes positioned lower than would be used for a traditional bicycle wheel rim, that is where the braking surface of the wheel rim is immediate adjacent the tyre. This may require the use of longer brake arms or cantilever type brakes rather than calliper style brakes.

The surface 8 of the outer annular portion 7 and or the lower surface 28 of the peripheral radial portion 10 can feature a plurality of surface features designed to create a turbulent boundary layer when the wheel travels through air to reduce aerodynamic drag on the wheel.

This then has significant advantages, the first of which is that the positioning of the thicker braking surface of the peripheral radial portion 10 is closer towards the hub of the wheel and that the outer annular portion 7 is as a result lighter. The movement of the mass towards the centre of the wheel provides for a lower rotation mass and as a consequence a lower rotational inertia. As such the wheel is faster to spin up.

A further advantage is in the improvement in braking power. By moving the braking surfaces (25 and 26) inwards towards the centre and away from the outer annular portion 7, there is less opportunity for debris such as mud and water to build up on them. Indeed, the outer annular portion 7 can be manufactured quite thin compared to a box section rim as there is no need to have machined braking surfaces on either side, the outer annular portion 7 need only be strong enough to support the outward pressure of the clincher tyre attached thereto as well as provide suitable structural strength to the wheel. This is in contrast to traditional box section clincher rims.

Moreover, as the breaking surface is moved away from the outer annular portion 7 then heat build up in the wheel, a common problem associated with carbon fibre clinchers rims, is less of an issue. The heat build up brought about by braking friction is instead localised to the braking surfaces (25 and 26) on the peripheral radial portion 10. Any build up of heat that might arise does not thus affect the rims capacity to restrain any clincher tyre thus reducing the possibility of clincher tyre blowouts.

The braking surfaces (25 and 26) act more like disc brake surfaces. Also, the brake pads used by the brakes can be larger therefore increasing braking power.

Metals, such as aluminium can be used to make such rims of the present invention, either from extrusion or casting. This then produces a wheel of suitable strength, while also providing a degree of aerodynamics. Carbon fibre construction may also be used Although the invention has been herein shown and described in what is conceived to be the most practical and preferred embodiment, it is recognized that departures can be made within the scope of the invention, which is not to be limited to the details described herein but it is to embrace any and all equivalent devices and apparatus.

The invention claimed is:

1. A bicycle wheel rim comprising an outer annular portion adapted to receive a tyre, and a flange extending radially inwardly from an outer surface of said outer annular portion, said flange having a plurality of circumferentially arranged spoke openings and a braking surface thereon, said braking surface being positioned between said plurality of circumferentially arranged spoke openings and said outer surface.

2. The bicycle wheel rim of claim 1, wherein the outer annular portion and the inner peripheral radial portion form a "Y" shape.

3. The bicycle wheel rim of claim 1, wherein the inner peripheral radial portion projects towards a hub portion of the bicycle wheel.

4. The bicycle wheel rim of claim 1, wherein the spoke openings are shaped to receive a head of a spoke.

5. The bicycle wheel rim of claim 2, wherein the inner peripheral radial portion projects towards a hub portion of the bicycle wheel.

6. The bicycle wheel rim of claim 2, wherein the spoke openings are shaped to receive a head of a spoke.

7. The bicycle wheel rim of claim 3, wherein the spoke openings are shaped to receive a head of a spoke.

8. The bicycle wheel rim of claim 5, wherein the spoke openings are shaped to receive a head of a spoke.

* * * * *